United States Patent [19]
Curry et al.

[11] 3,922,665
[45] Nov. 25, 1975

[54] APPARATUS AND METHOD FOR MAINTAINING OPERATOR ALERTNESS

[75] Inventors: Renwick E. Curry, Hingham; David Sheena, Randolph, both of Mass.

[73] Assignee: Whittaker Corporation, Los Angeles, Calif.

[22] Filed: Oct. 4, 1974

[21] Appl. No.: 511,964

[52] U.S. Cl. .................................. 340/279; 180/99
[51] Int. Cl.² .......................................... G08B 21/00
[58] Field of Search............ 340/279, 52 R; 180/99; 128/2 R

[56] References Cited
UNITED STATES PATENTS

| | | | |
|---|---|---|---|
| 3,611,344 | 10/1971 | Couper | 340/279 |
| 3,778,116 | 12/1973 | Kennedy | 340/279 |
| 3,788,357 | 1/1974 | Welk, Jr. | 340/279 |
| 3,794,968 | 2/1974 | Hill | 340/279 |
| 3,811,116 | 5/1974 | Takeuchi et al. | 340/279 |

*Primary Examiner*—Glen R. Swann, III
*Attorney, Agent, or Firm*—Nilsson, Robbins, Bissell, Dalgarn & Berliner

[57] ABSTRACT

Successive stimuli are initiated intermittently at selectively variable time intervals inversely related to the time taken by the operator in responding to the previous stimulus. The time required by the operator to detect and respond to each stimulus automatically varies the timing for initiating the next stimulus. In the preferred form, each stimulus is produced with a gradually increasing intensity, such as by amplitude modulating the volume of an audio tone, until the operator actuates a response switch to terminate the stimulus; and a much more severe stimulus, such as from an alarm bell, is given when no response is made within a given interval after a stimulus is initiated.

15 Claims, 2 Drawing Figures

FIG. I.

APPARATUS AND METHOD FOR MAINTAINING OPERATOR ALERTNESS

BACKGROUND OF THE INVENTION

Many accidents result from machine operators and drivers of automotive vehicles falling asleep or becoming inattentive from drowsiness or mental preoccupation, especially under monotonous conditions and the influence of alcohol or drugs. Heretofore, attempts to solve this problem have involved application of a continuous or periodic stimulus without regard to the existing physiological condition of the operator. A continuous or regularly repetitive mild stimulus might simply add to the monotony inducing drowsiness, whereas a more severe stimulus can alarm or distract an otherwise alert operator in the performance of his primary task.

Ideally the stimulus used to maintain alertness should match the physiological degree of drowsiness of the operator at any particular time. A physiological measurement of operator drowsiness might be obtained by monitoring heart rate, respiration, eyelid closure, electroencephalograph (EEG) activity and the like, but such methods require complex instrumentation that is most impractical and difficult to use in all but controlled laboratory conditions. Furthermore, the mere detection of drowsiness is not sufficient in itself to arouse the operator or prevent further occurrences as demonstrated by drivers who continue even after recognizing the danger of their falling asleep at the wheel.

Attempts have also been made to provide auxiliary or side tasks for the operator to perform in measuring concentration of primary tasks. In the present invention, a similar approach is employed to prevent or eliminate drowsiness by providing a feedback effect that measures the operator's performance as indicative of the degree of drowsiness being encountered. This feedback is then used to control initiation of successive intermittent stimuli so that a degree of randomness and uncertainty is introduced to stimulate interest in the task which thus does not become boring or sleep inducing itself.

SUMMARY OF THE INVENTION

The time interval between initiation of a stimulus and the operator's giving of a response to that stimulus is measured to automatically control the time delay until initiation of the next succeeding stimulus, with the delay interval being inversely related to the measured response time. Thus, successive intermittent stimuli are repeated at an increasing rate when an operator, such as the driver of a vehicle, exhibits slower response due to drowsiness. A more severe stimulus in the form of an alarm may be automatically actuated if the required response is not given by the operator within a predetermined maximum interval. In the preferred form of the invention, an audio tone stimulus of gradually increasing volume is generated to elicit operator response.

A system in accordance with the invention employs standard electronic components including a bistable "flip-flop" circuit for initiating a constant amplitude input upon receipt of a stimulus initiating signal. This input is applied to a first integrator to produce a fixed slope ramp signal that continues increasing at a constant rate until a response switch is actuated by the operator to terminate the constant amplitude input voltage and maintain the integrator outputs at the existing level of the ramp signal. The output of the first integrator is delivered to a second integrator that generates a parabolic shaped signal waveform that increases quadratically during the ramp, and is discharged when the response switch is operated so that the output is returned to its initial zero level. Thereafter the second integrator produces a ramp timing signal having a linear rate of increase proportional to the amplitude of the constant level output achieved in the first integrator. When this ramp output from the second integrator reaches a predetermined threshold level, a comparator generates a stimulus initiating signal to discharge the first and second integrators and again apply the constant amplitude input to the first to start another cycle.

The ramp output of the first integrator may be employed to amplitude modulate an audible tone that increases from a preselected minimum level to provide a progressively stronger stimulus until a response is made. A separate integrator and comparator arrangement may be used to automatically actuate an alarm arrangement providing a more severe stimulus capable of arousing the operator when no response is received within a predetermined maximum response interval.

DESCRIPTION OF THE INVENTION

While various types of stimuli and auxiliary tasks to be performed in response may be devised to suit specific situations, this invention will be described with reference to an apparatus suitable for use in an automobile, truck or similar vehicle where the operator is a cooperative participant in using the device. For example, simple tactile, auditory, or visual stimuli may be generated until terminated by the operator or may be initiated in intermittent short bursts continuously. Also, the stimuli may require performance of more complex tasks, such as solving a problem reflected on the windshield of a car through a collimating lens with the image focused at infinity to avoid the necessity of changing from far to near vision and to allow the driver to see and react to the road situation at the same time. The required response would be a correct answer to the problem with alteration of subsequent problem stimuli depending upon the degree of error in that response.

In the preferred form described herein, the vehicle-driver system includes an audible stimulus of increasing amplitude that is terminated by the operator response. The time taken in responding after initiation of the stimulus determines the length of the interstimulus interval with shorter response times automatically producing longer intervals until initiation of the next stimulus and longer response time, indicating drowsiness, producing shorter intervals until the next stimulus.

Figure 1:
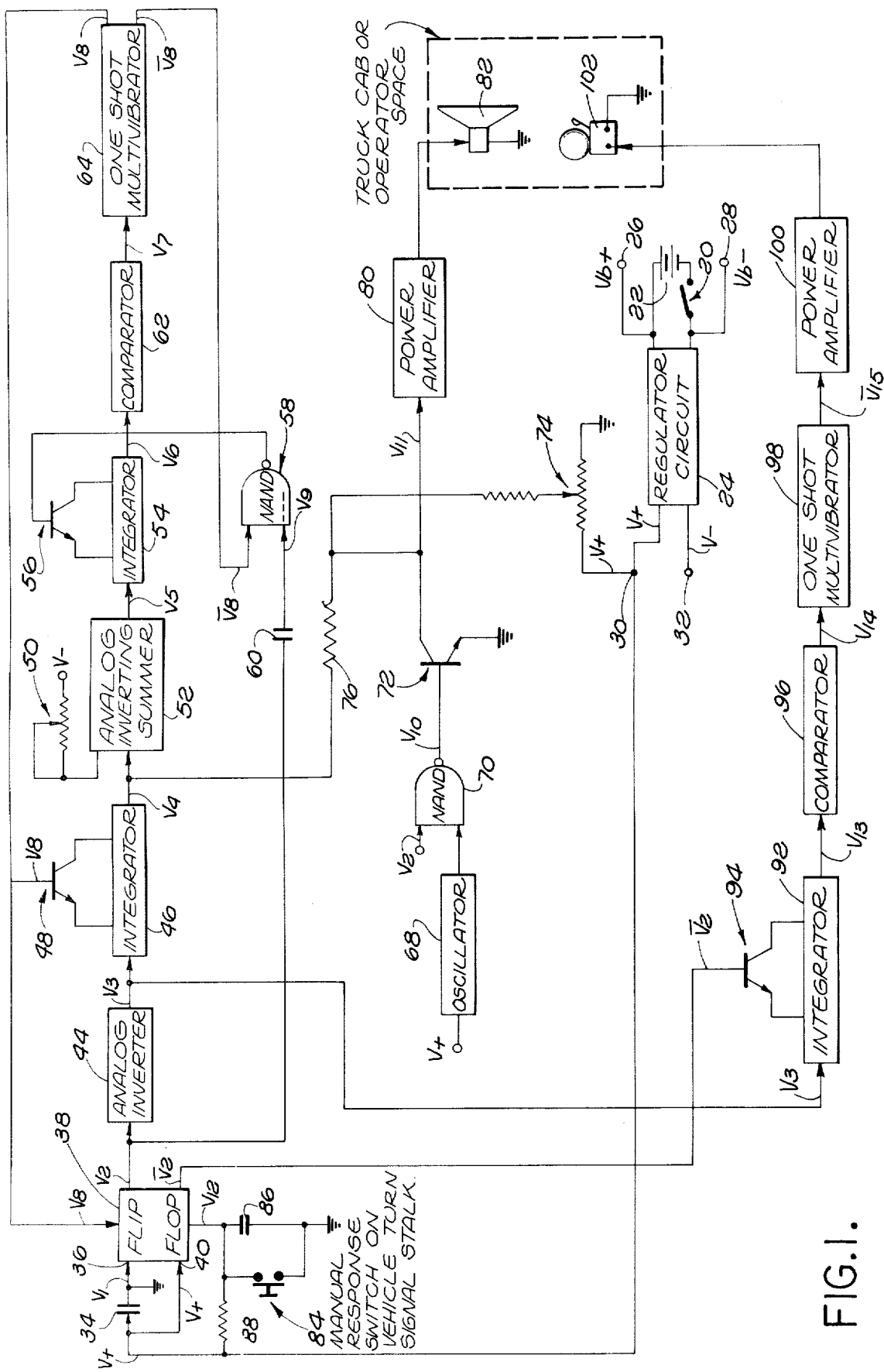
FIG. 1 is a schematic circuit diagram of a preferred embodiment of a system in accordance with the invention; and, FIG. 2 is a waveform timing diagram illustrating the relationship between signals appearing at various points within the electrical system of FIG. 1.
Figure 2:
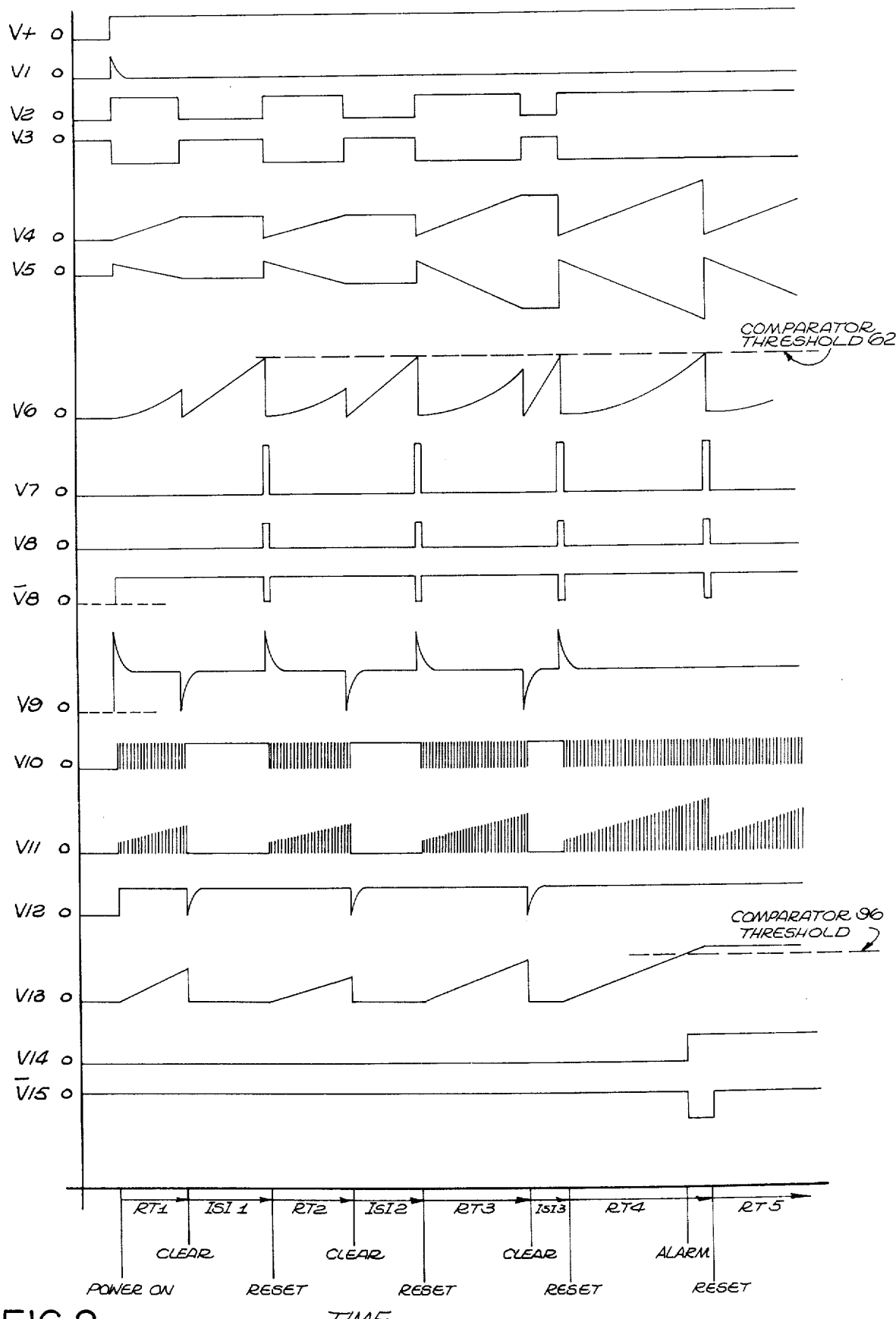

The operation of the method and apparatus of this invention is more readily understood by reference to the accompanying drawings wherein FIG. 1 illustrates the various electronic components of a preferred embodiment and FIG. 2 shows the interrelationship of various waveforms throughout the circuit through several operating cycles.

System operation is initiated by closing on-off switch 20 to apply power from a direct source 22, such as the typical 12 volt automobile battery and alternator system, to a voltage regulator 24 shown connected across battery terminals 26 and 28. The voltage across the battery terminals 26 and 28 can be used to supply operating power for output devices, such as an alarm, while the voltage regulator 24 provides stable V+ and V− voltages of about 5 volts each at its output terminals 30 and 32, respectively, as balanced operating voltages for solid state electronics.

The switch 20 is closed to apply the V+ voltage through an input capacitor 34 that produces a brief positive going clock pulse, as shown by waveform V1 in FIG. 2, at one input 36 of a flip-flop 38 which receives the V+ voltage at its other input 40.

The V1 pulse at input 36 acts as an initial stimulus initiating signal for placing the flip-flop 38 in its set state to supply a constant amplitude V2 voltage at one output to an analog inverter 44, which is typically an operational amplifier with unity gain. Inverter 44 provides a negative output V3 to a first integrator 46 that is of equal amplitude and opposite polarity to V2. The integrator 46, typically an operational amplifier with negative capacitive feedback, thus generates a positively increasing ramp signal in response to the constant amplitude negative V3 signal and the amplitude of its output (V4) remains constant at the existing ramp level when V3 returns to zero. Thereafter the integrator output V4 is returned to zero by a positive switching pulse applied at the base of transistor 48 to render it conductive to discharge the voltage developed across the feedback capacitor.

A selected DC voltage obtained by the setting of interstimulus interval control potentiometer 50 is applied at the input of analog inverting summer 52 to adjust the signal baseline for the inverted output waveform V5. Thus a negative voltage from potentiometer 50 added to the integrator output V4 results in a corresponding positive shift in the inverted V5 output so that the operator can vary the maximum interstimulus interval to last for a longer or shorter time, and as much as 2 minutes, if desired, following rapid responses by the operator.

A second integrator 54 receives the inverted V5 output from the summer 52 to generate a timing signal waveform V6 that has a positive going parabolic signal with quadratically increasing amplitude during the V5 ramp input and a ramp signal of constant slope with linearly increasing amplitude at a rate proportional to the constant amplitude V5 input. Switching transistor 56 is rendered conductive to discharge the integrator 54 to its initial zero or baseline level whenever a signal is applied from NAND gate 58 to its base terminal. The inputs for NAND gate 58 are the complementary $\overline{V8}$ output from one-shot multivibrator 64 and V9 pulse signals of alternating polarity that pass through capacitor 60 at the leading and trailing edges of the V2 pulses from flip-flop 38. In operation NAND gate 58 applies a positive switching pulse to the base of transistor 56 to discharge integrator 54 whenever either of its inputs V9 or $\overline{V8}$ goes low.

The V6 output waveform from integrator 54 is supplied to the input of a comparator 62 that generates a stimulus initiating pulse, as shown in waveform V7, whenever the amplitude of the integrator output exceeds a predetermined threshold. Each V7 stimulus initiating pulse actuates one-shot multivibrator 64 that provides complementary output waveforms V8 and $\overline{V8}$ wherein the V8 output voltage is low while $\overline{V8}$ is high when not actuated but upon actuation V8 briefly goes high while $\overline{V8}$ is low. When actuated, the V8 short duration positive pulse applied to the base of switching transistor 48 discharges the first integrator 46 and switches the flip-flop 38 to its set state to initiate another positive V2 output and $\overline{V2}$ is returned to zero.

An audio frequency signal from oscillator 68 is selectively transmitted through NAND gate 70 under control of the V2 output from flip-flop 38, as shown by waveform V10, to the base of a grounded emitter NPN transistor 72. When the V2 output is low, the NAND gate 70 maintains a constant high level output, but when V2 is high each positive oscillation cuts off the normally high NAND gate output so that the audio signal is reproduced in inverted form at the base of transistor 72 to be again inverted to provide an audio signal output V11 at its collector terminal. Thus the audio oscillations from oscillator 68 are transmitted to appear at the collector of transistor 72 in their original uninverted form whenever the V2 output from flip-flop 38 is high.

In the preferred embodiment, the gated audio oscillations are amplitude modulated by the positive going V4 ramp signal to produce a gradually increasing stimulus, which in this case is manifested as a progressively louder audible tone. The V4 ramp signal is applied through a dropping resistor 76 to the collector of transistor 72, which is also connected to receive a preselected positive voltage provided by an adjustable setting of minimum stimulus control potentiometer 74. Thus the V11 audio outputs are initiated at the beginning of each positive going V2 pulse with a selected minimum amplitude determined by the potentiometer setting, and the amplitude is thereafter increased at a constant rate by the V4 ramp signal.

Power amplifier 80 receives the amplitude modulated V11 audio oscillations to drive a loudspeaker 82 that emits a single audible tone at increasingly louder volume. Upon hearing the tone, the operator responds by performing some auxiliary task, such as actuating a response switch 84, which in a vehicle, for example, may be a touch sensitive pushbutton mounted on the turn indicator arm or steering wheel in a position readily accessible to the driver without interfering with his normal driving tasks.

In the preferred embodiment, response switch 84 is connected in parallel with a capacitor 86 that is coupled through resistor 88 to receive a positive charge from the V+ supply terminal 30 of the voltage regulator 24. Momentary closure of the response switch 84 by the operator discharges the V+ voltage previously maintained across the capacitor 86 to ground, and upon reopening the switch 84, the charge is gradually restored to the prior V+ level by a flow of charging current through resistor 88 to the capacitor 86, as shown by the voltage waveform V12, to produce a short duration negative going pulse that switches the flip-flop 38 to its reset state. In this condition, the V2 output of flip-flop 38 is low and its $\overline{V2}$ output is high so that the V4 ramp signal from integrator 46 and the V6 parabolic output from integrator 54 terminate and the V6 ramp begins with a slope proportional to the existing amplitude of the V4 ramp that is proportional to the response time and determines the duration of the succeeding interstimulus interval.

If the operator fails to respond within a reasonable interval to the mild audio tone stimulus produced by loudspeaker 82, an emergency condition is indicated where the operator has either fallen asleep or become otherwise inattentive or unable to perform his task. With the driver of a vehicle, immediate steps must be taken to restore wakefulness to avoid a serious accident, whereas a machine operator may simply need to be replaced. To meet such situations, the system is provided with a suitable alarm capability to initiate much stronger stimuli to alert the operator and compel immediate response or to indicate a need for other appropriate action. The knowledge that such an alarm is an impending possibility also keeps the operator in an alert state with a ready response.

For this purpose, a third integrator 92 receives the V3 output waveform from the analog inverter 44 to generate a positively increasing V13 ramp signal during the response time interval from initiation of the audible tone stimulus until the response switch 84 is closed to apply a positive going $\overline{V2}$ pulse to the base of transistor 94 to discharge the integrator output. The V13 ramp signal has a constant slope due to the fixed V3 pulse amplitude and reaches the preselected threshold level set for comparator 96 after a fixed time interval unless the response switch 84 is actuated to terminate the negative V3 input. If the V13 ramp signal amplitude reaches the set threshold, comparator 96 generates a positive going V14 output signal to trigger a one-shot multivibrator 98 that produces a negative going $\overline{V15}$ pulse of about ½–1 second duration. This $\overline{V15}$ pulse drives power amplifier 100 to actuate an alarm 102, which can be a direct current buzzer or the like that produces a loud annoying noise to alert the operator and compel a response.

Summarizing the system operation, closure of on-off switch 20 initiates the first response time interval RT1 in FIG. 2 by supplying operating power from the battery 22 across its terminals 26 and 28 to provide a regulated 5 volt supply at the output terminals 30 and 32 of the voltage regulator 24. This produces a brief positive pulse V1 through capacitor 34 at one input 36 of flip-flop 38 to place it in its set state to apply a constant amplitude input voltage V2 to analog inverter 44. The inverted output V3 applied to the integrators 46 and 92 produces positively increasing ramp signals V4 and V13, respectively that continue until the response switch 84 is closed. The V4 ramp signal is inverted by analog inverting summer 52 to be combined with a negative voltage selected by the setting of interstimulus interval control potentiometer 50 that introduces a desired positive shift in the baseline of the inverted output signal V5. The integrator 54 first generates a parabolic output signal V6 in response to the ramp signal V5 until the response switch 84 is closed or until it eventually reaches the threshold level of comparator 62.

Except when comparator 62 is triggered by an input V6 level above its threshold, one-shot multivibrator 64 generates a positive output $\overline{V8}$ applied to NAND gate 58, which also receives negative going pulses V9 at the falling edge of positive output pulses V2 from flip-flop 38 so that an output pulse from NAND gate 58 discharges integrator 54 through transistor 56 when response switch 84 is closed. Audio frequency signals from oscillator 68 are transmitted by NAND gate 70 to be applied to the base of transistor 72 during the time that the V2 output is positive RT1 which continues until the response switch 84 is actuated. The collector of transistor 72 receives the ramp signal V4 through resistor 76 to be combined with a minimum stimulus control voltage from potentiometer 74, so that the audio output V11 is amplitude modulated to increase gradually from a selected minimum. The modulated audio signal V11 drives loudspeaker 82 through power amplifier 80 to produce an increasingly audible stimulus during time RT1, which ends when response switch 84 is closed to reset flip-flop 38, thus initiating the first interstimulus interval ISI 1.

The resulting low signal from output V2 of flip-flop 38 effectively causes NAND gate 70 to stop the audible tone stimulus from loudspeaker 82. In addition, the high complementary signal $\overline{V2}$ discharges the output of integrator 92 through transistor 94 and causes it to remain at its initial zero level until the negative V3 input is again received during the subsequent response time interval RT2. Closing the response switch 84 thus terminates the ramp output V13 of integrator 92 before it reaches the threshold of comparator 96 to actuate the alarm 102.

Since the V2 and V3 outputs both remain at zero during the interstimulus interval ISI 1, the amplitude of the V4 output is held constant. The analog inverter output V5 similarly remains constant so that the integrator 54 generates an increasing ramp signal V6 with a constant slope proportional to the constant input amplitude V5. Thus, the rate of increase of the ramp signal V6 that determines the duration of the interstimulus interval is proportional to the response time RT1 taken for the operator to react to the audible signal from loudspeaker 82. This ramp signal V6 begins from an initial zero level since a pulse from NAND gate 58 has been applied to transistor 56 to discharge the integrator 54 when the response switch 84 was closed. This provides a brief negative pulse at the input of NAND gate 58 through capacitor 60 as the V2 output returned to zero. Thus, during the interstimulus interval ISI 1, the V6 ramp signal increases from the zero level until it reaches the preselected threshold level of comparator 62, whereupon the interstimulus interval ends. Thus, longer response times produce a greater ramp slope to result in shorter interstimulus intervals. Then, as the ramp voltage V6 reaches the threshold of the comparator 62, an output pulse V7 triggers the one-shot multivibrator 64 to generate complementary positive V8 and negative $\overline{V8}$ going pulse outputs. The negative going $\overline{V8}$ pulse produces a pulse from NAND gate 58 to discharge integrator 54 returning its output V6 to the zero level, while the positive going V8 pulse is applied to transistor 48 to discharge integrator 46 returning its output V4 to zero. The V8 pulse is also applied to return the flip-flop 38 to its original set state to initiate the next timing sequence that begins the second response time interval RT2. As may best be appreciated from the waveform diagram in FIG. 2, the progressively longer second and third response times RT2 and RT3 produce correspondingly greater rates of increase in the slope of V6 ramp signals to shorten the succeeding interstimulus intervals ISI 2 and ISI 3.

The system alarm 102 is actuated in the event that the response time increases beyond a predetermined maximum limit. Unless the operator closes the response switch 84, the V6 parabolic signal eventually reaches the threshold level of comparator 62 to actuate one-shot multivibrator 64 thus discharging the integrator 54 through NAND gate 58. However, before the V6 parabolic signal reaches the threshold of comparator 62, the V13 ramp signal from integrator 92 exceeds the threshold of comparator 96 to trigger one-shot multivibrator 96 so that the power amplifier 100 actuates the alarm 102 to arouse the driver or operator.

If, due to background noise, the alarm 102 initiates before the operator has an adequate opportunity to hear and respond to the stimulus, he may adjust the minimum stimulus control 74 to increase the initial volume of the tone emitted from loudspeaker 92. In the alternative, an automatic minimum stimulus control might be provided to sample and adjust for background noise. In such alternative embodiment, the control 74 shown in FIG. 1 may be replaced with a microphone that detects the average background noise level through a demodulator and low-pass filter arrangement to generate a signal voltage proportional to the detected noise level. This noise signal voltage may be appropriately scaled and amplified to be applied in place of the manually adjustable voltage from the minimum stimulus control potentiometer 74, thus automatically adjusting the volume of the audible tone stimulus to match the background noise level.

It will be apparent from the foregoing that various modifications may be made in the specific circuitry without departing from the scope of the invention, so that the invention is not limited to the specific embodiments employed herein to describe the invention. For example, various other stimuli could be employed and other types of electronic logic might be employed in performing these functions. In addition, another timing sequence may be desirable depending upon the application, such as a stimulus which automatically terminates rather than requiring manual termination or an interstimulus interval which depends on more than one response time.

What is claimed is:

1. An apparatus for intermittently detecting operator alertness and altering stimuli in response to the detected degree of operator alertness, comprising:
   means for initiating successive intermittent first stimuli detectable by the operator;
   response means actuated by the operator upon detection of each such first stimulus; and,
   detection means responsive to the initiation of each stimulus and the actuation of said response means for selectively modifying subsequent stimuli in inverse proportion to the operator alertness indicated by the detected actuation of the response means by the operator.

2. The apparatus of claim 1 wherein:
   said detection means varies the time period before initiation of stimulus in inverse proportion to the time interval between initiation of the preceding stimulus and actuation of the response means.

3. An apparatus for intermittently detecting operator alertness and for altering operator stimuli in response to the detected degree of alertness, comprising:
   means for intermittently initiating successive first stimuli, each of which becomes progressively greater in magnitude so as to be more detectable by the operator;
   operator actuated response means for terminating said stimulus; and,
   variable timing means for controlling said initiating means to initiate each stimulus following termination of the preceding stimulus after a time delay inversely related to the magnitude of the preceding stimulus upon termination.

4. The apparatus of claim 3, further comprising:
   means for automatically initiating a second more severe stimulus when the operator actuated response means is not actuated within a predetermined time interval after initiation of each first stimulus.

5. The apparatus of claim 4 wherein:
   said first and second stimuli are audible signals.

6. The apparatus of claim 4 wherein:
   said stimuli initiating means includes audio frequency generating means responsive to said variable timing means for modulating the amplitude of an audio frequency signal to produce a detectable audible tone stimulus of increasing volume.

7. A system for intermittently detecting operator alertness and for altering the repetition interval between successive stimuli in response to the detected time taken by the operator to respond to each stimulus, comprising:
   bistable switching means responsive to a stimulus initiating signal for maintaining a constant amplitude output and responsive to an operator response signal for terminating said output;
   an operator response switch actuated by the operator for applying said operator response signal to said bistable switching means;
   a first integrator coupled to receive said constant amplitude output for generating a fixed ramp signal of constant slope and for terminating said ramp signal to maintain a constant signal voltage equal to the maximum amplitude of said ramp signal upon termination of said constant amplitude output from said bistable switching means;
   a second integrator coupled to receive the output of said first integrator to generate a parabolic output in response to said ramp signal and for generating a variable ramp output having a slope proportional to said constant signal voltage maintained by said first integrator;
   comparator means coupled to receive the output of said second integrator for generating said stimulus initiating signal when the amplitude of said parabolic or variable ramp outputs from said second integrator reach a preselected threshold level;
   circuit means coupled to the output of said second integrator for discharging said parabolic and ramp outputs to restore an initial zero output level in response to said initiating signal and to said response signal; and,
   means for initiating a desired stimulus to be sensed by the operator responsive to said stimulus initiating signal.

8. The system of claim 7, further comprising:
   alarm means for generating a severe stimulus when said operator response signal is not generated by actuation of said operator switch within a predetermined fixed time interval following each stimulus initiating signal.

9. The system of claim 7 wherein said means for initiating a desired stimulus comprises:
   means for continuously generating an audio frequency signal capable of producing an audible tone stimulus;
   amplitude modulation means responsive to the fixed ramp signal generated by said first integrator to gradually increase the amplitude of said audio frequency signal from a predetermined minimum level in accordance with the increase in the amplitude of said ramp signal; and,
   gating means responsive to the constant amplitude output from said bistable switching means for selectively transmitting said audio frequency signal to said amplitude modulating means, whereby the modulated audio frequency signal provides an audible tone stimulus of increasing volume.

10. A method for intermittently detecting operator alertness to alter operator stimuli in accordance with the detected degree of alertness, comprising the steps of:
- initiating successive intermittent stimuli detectable by the operator;
- determining the time interval between the initiation of each said stimulus and the actuation of a stimulus response means by said operator; and,
- delaying initiation of the subsequent stimulus for an interval inversely related to the time interval between initiation of the previous stimulus and the operator's actuation of the stimulus response means.

11. A method for intermittently detecting operator alertness and altering the repetition rate of successive operator stimuli in response to the detected time taken by the operator to respond to the preceding stimulus, comprising the steps of:
- (step 1) generating a fixed input voltage in response to a stimulus initiation signal until terminated by an operator response signal;
- (step 2) integrating said fixed input voltage to produce a ramp signal having a fixed predetermined slope;
- (step 3) integrating said ramp signal to generate an increasing signal output with a gradually increasing slope;
- (step 4) generating an operator response signal when a switch means is actuated by the operator;
- (step 5) maintaining a constant amplitude signal voltage equal to the amplitude of said ramp signal upon generation of said operator response signal;
- (step 6) discharging said increasing signal output produced by integrating said ramp signal to restore an initial zero level signal output upon generation of said operator response signal;
- (step 7) integrating said constant amplitude signal voltage to generate a second ramp signal having a slope proportional to the amplitude of said constant amplitude signal;
- (step 8) generating said stimulus initiating signal when the amplitude of said second ramp signal reaches a predetermined threshold level or, in the absence of an operator response signal, when the amplitude of said increasing signal output reaches said predetermined threshold level; and,
- (step 9) repeating steps (1) through (8).

12. The method of claim 11 further comprising:
- applying said ramp signal having a fixed predetermined slope to modulate the amplitude of a continuously generated audio frequency signal to gradually increase its amplitude from a predetermined minimum in accordance with the amplitude of said ramp signal;
- selectively gating said continuously generated audio frequency signal to be amplitude modulated during generation of said fixed input voltage; and,
- reproducing said amplitude modulated audio frequency as an audible tone of increasing volume to constitute said stimuli.

13. An apparatus for intermittently detecting and maintaining the alertness of the driver of a vehicle without distraction from normal driving tasks, said vehicle having a steering wheel assembly within a driver compartment, comprising:
- means for intermittently initiating an audible tone stimulus of increasing volume within the driver compartment to be heard by the driver;
- a pushbutton response switch mounted adjacent the steering wheel assembly of the vehicle to be manually actuated by the driver upon detection of said audible tone; and,
- interval detection means responsive to the initiation of each audible tone stimulus and the actuation of said pushbutton response switch for selectively delaying initiation of each subsequent audible tone stimulus for a time period inversely related to the time interval measured between initiation of the preceding stimulus and actuation of the pushbutton response switch by the driver.

14. The apparatus of claim 13 wherein a turn signal stalk is mounted on the steering wheel assembly, and wherein:
- said pushbutton response switch is mounted on the turn signal stalk extending from the vehicle steering wheel assembly.

15. The apparatus of claim 13 further comprising:
- an audible alarm for producing a loud bell or buzzer noise within the driver compartment of the vehicle; and,
- timing means responsive to the initiation of each audible tone stimulus and to the manual actuation of said pushbutton response switch for sounding said audible alarm for a fixed interval whenever said pushbutton response switch is not actuated within the determined time interval following initiation of each audible tone stimulus.

* * * * *